United States Patent
Tietzen et al.

(10) Patent No.: US 11,010,770 B2
(45) Date of Patent: May 18, 2021

(54) METHOD, SYSTEM AND COMPUTER PROGRAM FOR PROVIDING A LOYALTY ENGINE FOR AUTOMATED CAUSE MARKETING

(75) Inventors: Terrance Patrick Tietzen, Edmonton (CA); Timothy Makoto Yamamoto, Edmonton (CA); Ronald James MacKay, Edmonton (CA)

(73) Assignee: Edatanetworks Inc., Edmonton (CA)

( * ) Notice: Subject to any disclaimer, the term of this patent is extended or adjusted under 35 U.S.C. 154(b) by 294 days.

(21) Appl. No.: 12/525,326

(22) PCT Filed: Feb. 1, 2008

(86) PCT No.: PCT/CA2008/000225
§ 371 (c)(1),
(2), (4) Date: Sep. 8, 2009

(87) PCT Pub. No.: WO2008/092279
PCT Pub. Date: Aug. 7, 2008

(65) Prior Publication Data
US 2010/0004992 A1  Jan. 7, 2010

(30) Foreign Application Priority Data
Feb. 1, 2007 (CA) ................................ CA 2576594

(51) Int. Cl.
*G06Q 30/02* (2012.01)
(52) U.S. Cl.
CPC ......... *G06Q 30/02* (2013.01); *G06Q 30/0232* (2013.01); *G06Q 30/0236* (2013.01)
(58) Field of Classification Search
CPC .... G06Q 30/02; G06Q 40/12; G06Q 30/0232; G06Q 30/0236
(Continued)

(56) References Cited

U.S. PATENT DOCUMENTS

| | | | | |
|---|---|---|---|---|
| 5,621,640 A | * | 4/1997 | Burke | G06Q 20/04 235/375 |
| 6,876,971 B1 | * | 4/2005 | Burke | G06Q 20/04 705/14.1 |

(Continued)

FOREIGN PATENT DOCUMENTS

| | | | | |
|---|---|---|---|---|
| CA | 2468386 A1 | 11/2005 | | |
| WO | WO 2002/001428 A2 | * | 1/2002 | ............. G06Q 40/02 |
| WO | 2005036432 A1 | 4/2005 | | |

OTHER PUBLICATIONS

European Patent Office, Summons to attend oral proceedings for EP Application No. 08714548.8 dated May 9, 2016.
(Continued)

*Primary Examiner* — David J Stoltenberg
(74) *Attorney, Agent, or Firm* — Bradley K. DeSandro; Desandro Law Group PLLC

(57) ABSTRACT

A method, system and computer program for providing a loyalty engine for automated cause marketing. The method includes a loyalty program system administrator linking merchants and charities to the loyalty system. Members register with the loyalty engine through loyalty system which is accessible via the Internet. Once the merchants and the charities are linked and the members are registered, by operation of the loyalty engine, the merchants can create a customized loyalty program defined by a plurality of merchant defined rules for administering their loyalty program. The merchant defined rules instruct the loyalty engine as to which charities should receive in-kind donations in connection with one or more transactions by a member that is associated to the loyalty program. Once a loyalty system defined time period or donation threshold has been achieved, the loyalty system releases the donation in-kind to the specific charity. A system is also provided that consists of a server computer including the loyalty engine and the charity (Continued)

utility. The charity utility provides the functions of the method and is linked to a server computer that is connected to the Internet. The computer program of the invention is a web application that enables the members, charities, and merchants to access the functions of the invention via a web browser.

16 Claims, 13 Drawing Sheets

(58) Field of Classification Search
USPC .......................................................... 705/14
See application file for complete search history.

(56) References Cited

U.S. PATENT DOCUMENTS

| | | | |
|---|---|---|---|
| 6,945,453 B1* | 9/2005 | Schwarz, Jr. .......... | G06Q 10/08 235/375 |
| 7,360,693 B1 | 4/2008 | Sullivan | |
| 2002/0073026 A1* | 6/2002 | Gruber ............... | G06Q 30/0279 705/39 |
| 2002/0099601 A1* | 7/2002 | Farrell .................... | G06Q 30/02 705/14.32 |
| 2002/0116214 A1* | 8/2002 | Horn ....................... | G06Q 30/02 705/329 |
| 2002/0143626 A1* | 10/2002 | Voltmer ............... | G06Q 20/208 705/14.27 |
| 2002/0188509 A1* | 12/2002 | Ariff .................. | G06Q 30/0208 705/14.25 |
| 2003/0126073 A1* | 7/2003 | Lawrence .............. | G06Q 30/02 705/38 |
| 2003/0130895 A1* | 7/2003 | Antonucci ......... | G06Q 30/0229 705/14.27 |
| 2004/0034563 A1* | 2/2004 | Brissette ................. | G07F 7/025 705/329 |
| 2004/0039649 A1* | 2/2004 | Mull ...................... | G06Q 20/04 705/39 |
| 2004/0249752 A1* | 12/2004 | Prato ..................... | G06Q 20/04 705/41 |
| 2005/0109840 A1* | 5/2005 | Walker, Jr. ......... | G06Q 30/0239 235/380 |
| 2005/0228744 A1* | 10/2005 | McHale ................. | G06Q 30/08 705/37 |
| 2006/0167765 A1* | 7/2006 | Lacey .................... | G06Q 30/00 705/26.1 |
| 2006/0178938 A1* | 8/2006 | Wallace ................. | G06Q 30/02 705/26.1 |
| 2006/0195379 A1* | 8/2006 | Abecassis .............. | G06Q 30/02 705/35 |
| 2006/0208065 A1* | 9/2006 | Mendelovich ......... | G06Q 30/02 235/380 |
| 2007/0011089 A1* | 1/2007 | DeSchryver .......... | G07F 19/201 705/39 |
| 2007/0055567 A1* | 3/2007 | Viitaharju .......... | G06Q 30/0241 705/14.4 |
| 2007/0078766 A1* | 4/2007 | Thomas ............. | G06Q 20/1085 705/43 |
| 2008/0222029 A1* | 9/2008 | Poster .................... | G06Q 20/10 705/39 |
| 2008/0301035 A1* | 12/2008 | Mercier ................. | G06Q 40/00 705/37 |
| 2009/0043651 A1* | 2/2009 | Schwarz, Jr. ...... | G06Q 30/0215 705/14.27 |
| 2009/0099918 A1* | 4/2009 | Ladoulis ................ | G06Q 40/02 705/14.1 |
| 2009/0299845 A1* | 12/2009 | Antonucci ........... | B01J 23/8913 705/14.28 |
| 2010/0153200 A1* | 6/2010 | Thomas ................. | G06Q 40/12 705/14.17 |

OTHER PUBLICATIONS

WIPO, International Search Report and Written Opinion for PCT Application No. PCT/CA2008/000225 dated Jun. 12, 2008.
Canadian Intellectual Property Office, Office Action for CA Application No. 2,677,134 dated Jan. 5, 2015.
Canadian Intellectual Property Office, Office Action for CA Application No. 2,576,594 dated Feb. 18, 2014.
Canadian Intellectual Property Office, Office Action for CA Application No. 2,576,594 dated Apr. 2, 2015.
European Patent Office, Office Action dated Jan. 22, 2013 issued in European Patent Application No. 08714548.8.
Canadian Intellectual Property Office, Examiner's Requisition dated Feb. 1, 2016, issued in Canadian Patent Application No. 2,677,134.

* cited by examiner

METHOD, SYSTEM AND COMPUTER PROGRAM FOR PROVIDING A LOYALTY ENGINE FOR AUTOMATED CAUSE MARKETING

PRIORITY

This application claims the benefit of Canadian Patent Application No. 2,576,594, filed Feb. 1, 2007.

FIELD OF THE INVENTION

The present invention relates to creation and administration of an automated cause marketing system which through the use of a loyalty system provides donations for identified charitable causes.

BACKGROUND OF THE INVENTION

In an ever globalizing economy, the need for customer acquisition and customer retention systems is becoming increasingly important for business. Numerous customer loyalty and customer acquisition programs are known. In addition, linking charitable organizations with customer loyalty and customer acquisition is also known. Cause marketing is not a new concept; many forms exist today such as: COMMUNITY SMART™, which makes credit cards available, and specified donations are made to a charity of the customer's choice.

Other examples include KIDS FUTURES™ and UPROMISE™. These prior art solutions provide co-branded financial cards with a charity as a partner, which are issued to a customer who uses it and the charity shares in the applicable interchange fees.

An example of prior art charitable giving using a stored value card is CANADA HELPS™. This company utilizes a stored value card as a gift to a recipient to donate to the charity of their choice. The person who receives the gift is free to donate to the registered charities that are registered to their system thus allowing for the recipient of the stored value card to donate to the charity that they choose to support. This system does not allow for donations to be generated from a merchant; all donations are generated from front loading the donation amount with an administration fee.

It should be understood that in this disclosure the term "merchant" refers to an entity that participates in a loyalty program to build loyalty with customers, and potentially acquire new business, and in exchange is willing to provide a loyalty "benefit" (e.g. in kind charitable contribution). A "member" refers to the customer or potential customer who is a registered member of the loyalty program referred to. A "charity" refers to the registered charitable organization of the loyalty program. A "beneficiary" refers to the recipient of the benefit of the donated good or service in-kind.

What is lacking with the aforementioned prior art is flexibility in the manner in which transactions triggering donations to the charity must occur. The benefit that a merchant participating in a loyalty program is willing to provide will depend on a particular merchant and their business objectives at a particular time. The prior art solutions do not enable merchants to suitably reflect these changing objectives in the manner in which donations are processed in the context of the loyalty program. For example, a merchant that earmarks certain funds for charitable donations and is reaching the end of its reporting period with unspent funds for charitable use may have a limited time to boost its donations.

In addition, it is desirable to maximize the donations available to charities. Merchants are generally willing to provide donations of greater market value if they are able to provide in-kind donations of their goods or services as opposed to cash donations. In-kind donations enable merchants to reduce the cost per unit of their donation, for example, by clearing inventory levels, using already paid for resources, motivating personnel to further reduce the per unit cost of the donation. The lower cost to the merchant of in-kind donations often enables charities to obtain a donation having a greater market value than would be possible otherwise. For instance, a merchant may have seasonal inventory or inventory that is time sensitive, this inventory is perishable and if not used will not be of any practical use. Examples of this type of inventory include airline tickets and golf tee times. The merchant has a desire to sell the existing inventory as it does not have any value after a certain time period. The system outlined herein provides a means for the merchant to use the inventory for the creation of revenue and donations thus lowering underutilized inventory.

Therefore there is a need for a loyalty program linked to charitable in-kind donations that allows the participation of multiple merchants, and that permits flexibility enabling the charity benefit to be maximized by responding to changing business objectives. There is a further need for a loyalty program that enables multiple merchants to reflect their changing business objectives by dynamically modifying the rules of the loyalty program as they relate to charitable donations. More specifically, there is a need for a loyalty program that enables merchants to customize their loyalty program, including as it relates to charitable donations, on the fly, including based on effectiveness and incremental cost in a dynamic fashion that more properly reflects the dynamic nature of business.

Many charities have important profile and very significant donor lists. This profile and these donor lists have not generally been leveraged to the benefit of a loyalty program because charities are reluctant to associate their goodwill with a loyalty program, in many cases in large part because the loyalty program lacks transparency to the members in that they cannot readily track the relationship between their activities within the loyalty program and the donations made to the charity.

There is a further need for a loyalty program that enables members to obtain data regarding their activities within the loyalty program that are eligible for charitable donations and also regarding donations made on their behalf to charities.

The level of contribution that merchants would be willing to provide to a charity in the context of a loyalty program has been limited in part because prior art solutions did not adequately address the need for business to verify the commercial benefit derived by the merchants. Related charitable donations could be increased if the merchants were given the tools to measure and monitor the effectiveness and incremental cost of their activities involving charitable donations. There is a need therefore for a method, system and computer program that enables merchants to monitor and verify the commercial benefit that they are deriving from the charitable donations, thereby encouraging the merchants to increase their charitable donations.

Another factor that has contributed to reluctance of both merchants and charities to participate in the type of activity described above, and thereby depriving themselves of the mutual benefits, is the fact that most prior art solutions involve (in the context of the particular loyalty program)

association with a limited number of merchants with a single or small number of charities (usually with different purposes). Merchants are concerned of alienating at least some of their customer base, for example by associating with one charity but not another charity favoured by a part of their customer base. Similarly, charities are loathe to bring attention to the fact that they are associating with one merchant, but not a competing merchant, for example, favoured by a number of their donors. This aspect is exacerbated by increased competition for donations by charities, and also the polarization that may exist between the respective customer bases of companies that are highly competitive with one another (especially where comparative advertising is used).

There is a further need for a method, system and computer program that achieves the aforesaid advantages using in-kind donations by a plurality of merchants.

Co-Pending Canadian Application No. 2,468,386, filed on May 27, 2004, describes a "Method, System, and Computer Program for Providing a Loyalty Engine Enabling Dynamic Administration of Cross-Promotional Loyalty Programs (the "Co-Pending Patent Application"). The Co-Pending Patent Application generally describes a system, method and computer programs that permits dynamic interactions between a plurality of merchants and a plurality of members. In the particular invention, the solution described in the Co-Pending Patent Application 2,468,386 enables the merchants to dynamically customize loyalty programs based on effectiveness and incremental cost. Co-Pending Patent Application No. 2,546,151 describes a "Method, System, and Computer Program for Providing a Loyalty Engine for Dynamic Administration of Charity Donations". In particular, the 2,546,151 invention allowed for the creation of relationships between members, merchants and charities in the context of a loyalty program. There is a further need to develop and oversee relationships between members, merchants and charities in the context of a loyalty program pertaining to in-kind charitable donations.

SUMMARY OF THE INVENTION

In one aspect of the present invention, a method for providing a loyalty program linked to charitable in-kind donations is provided, the method characterized by: (a) linking one or more charities with the loyalty program; (b) linking one or more member purchasers with the loyalty program; (c) each of a plurality of merchants linked to the loyalty program creating a customized loyalty program defined by a plurality of rules for administering their loyalty program, including the rules under which each of the plurality of merchants will make in-kind donations of goods or services to the one or more charities based on one or more purchases made by members from the plurality of merchants; and (d) the loyalty program accumulating the in-kind donation of goods or services and providing means to the one or more charities to distribute the in-kind donations to one or more beneficiaries.

In another aspect of the present invention, a system for providing a loyalty program linked to charitable in-kind donations presented by a plurality of merchants, a plurality of members, and a plurality of charities registered with the loyalty program is provided, characterized in that the system comprises: (a) a server computer connected to the Internet; and (b) a web application linked to the server, the web application defining a loyalty engine that enables a plurality of merchants, of charities, of members and a loyalty system administrator to create and manage customized loyalty programs defined by a plurality of rules interpreted by the loyalty engine for administering at least one loyalty program; wherein the loyalty engine includes a charity utility being operable to enable the loyalty system administrator to link one or more charities, a plurality of merchants and one or more members with the loyalty program; wherein the loyalty engine includes a charity utility enabling the plurality of merchants to optionally define the rules under which as part of their loyalty program, they will make in-kind donations to one or more charities based on one or more purchases made by members from the plurality of merchants; wherein a charity utility enables the loyalty program to keep track of the accumulating in-kind donations to one or more charities based on one or more purchases made by members from the plurality of merchants; and wherein the loyalty program includes a programmed stored value card for redemption of goods and services of in-kind donations.

In yet another aspect of the present invention, a computer program is provided, the computer program characterized by: computer instructions which when loaded on a server computer connected to the Internet are operable to provide a web application defining a loyalty engine that enables a plurality of merchants, charities, members and loyalty system administrator to create and manage customized loyalty programs defined by a plurality of rules interpreted by the loyalty engine for administering their loyalty programs; wherein the loyalty engine includes a charity utility being operable to enable the loyalty system administrator of the loyalty engine to register one or more charities, a plurality of merchants and one or more members associated with the loyalty program; wherein the charity utility enables the plurality of merchants to optionally define the rules under which, as part of their loyalty program, they shall make an in-kind donation to the one or more charities in connection with one or more purchases made by members from the plurality of merchants; and wherein based on a member optionally selecting one or more of the charities, the charity utility being further operable, based on such selection and the donation rules to: (a) track transactions between the merchants and the member; (b) apply the donation rules; and (c) accrue donations to be made by the plurality of merchants to the applicable charities based on one or more transactions between the plurality of merchants and the member.

BRIEF DESCRIPTION OF THE DRAWING

A detailed description of the preferred embodiment(s) is(are) provided herein below by way of example only and with reference to the following drawings, in which.

Figure 1:
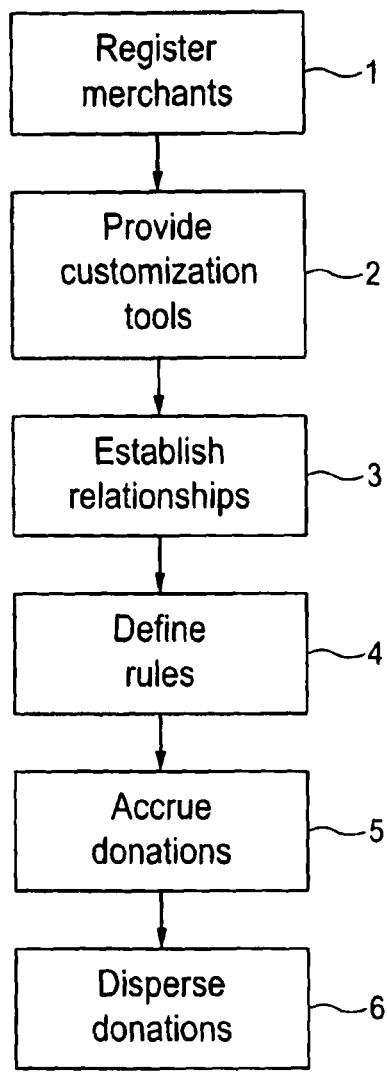
FIG. 1 is a flowchart summarizing the method of the present invention overall.

In the drawings, preferred embodiments of the invention are illustrated by way of example. It is to be expressly understood that the description and drawings are only for the purpose of illustration and as an aid to understanding, and are not intended as a definition of the limits of the invention. It will be appreciated by those skilled in the art that other variations of the preferred embodiment may also be practised without departing from the scope of the invention.

DETAILED DESCRIPTION OF THE INVENTION

FIG. 1 illustrates the overall method of the present invention. The method may consist of registering (1) a plurality of merchants with the loyalty program. The plurality of merchants may be provided with tools to customize (2) one or more loyalty programs. The operator of the loyalty program or loyalty program administrator may establish relationships with one or more charities and may register (3) the charities with the loyalty program (further illustrated in FIG. 3). The relationships among the charities, merchants and members may be governed by rules under which the plurality of merchants may make donations to the one or more charities based on purchasing activities of members in connection with the loyalty program. Through tools provided by the loyalty program, the operator and each participating merchant may define rules (4) for each participating merchant to make donations to the one or more charities, in conformity with the rules that may be established between the operator and the one or more charities. When a loyalty program member initiates a transaction at the place of business of a participating merchant, accrual of a donation (including of in-kind donations) to the benefit of beneficiaries of the charity may be triggered by the loyalty program and tracked (5) by a charity account of the loyalty program member provided by the loyalty system. Once the threshold value as specified by the specific charity has been reached (time or value as per FIG. 7), in one aspect of the invention an in-kind donation as indicated by the loyalty program charity defined rule may be dispersed (6) to the charity. Upon receipt of the donation, the charity may then issue the donation in-kind to a beneficiary for redemption based on one or more dispersal methods, including SVC as particularized below.

Figure 10:
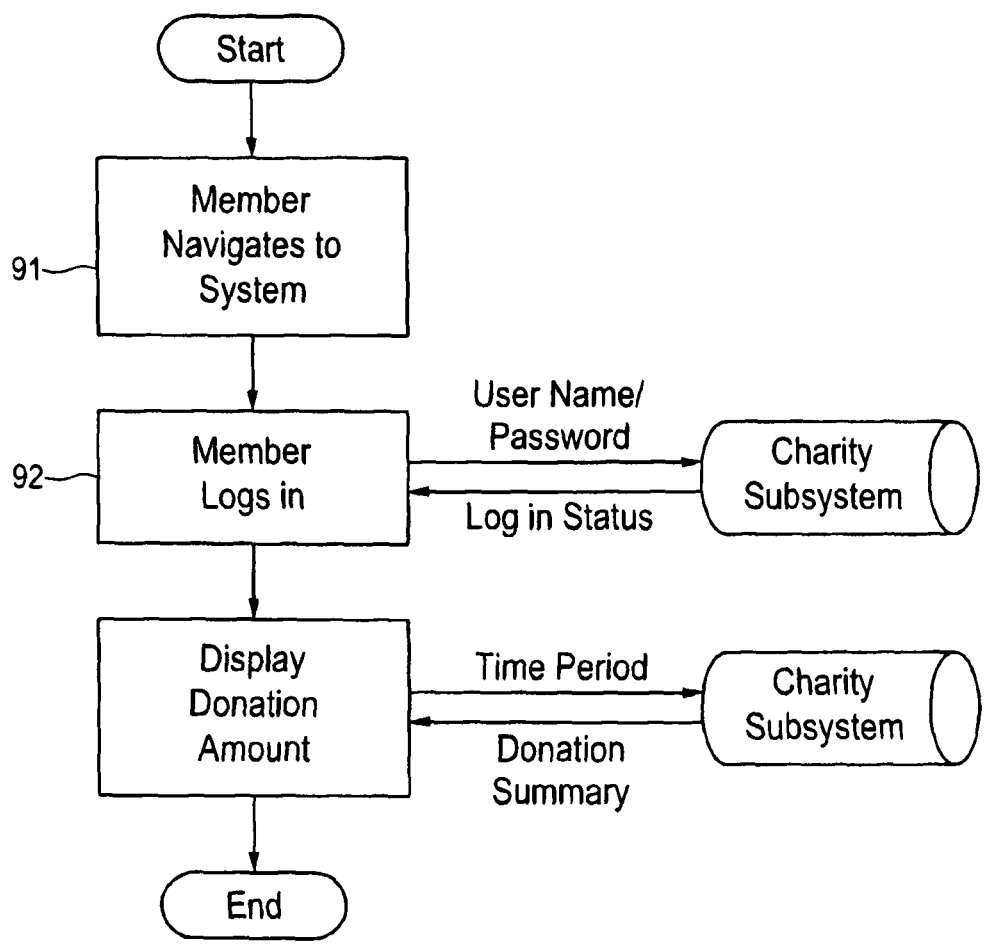
FIG. 10 illustrates how a merchant views the donations that have been generated are displayed.
Figure 11:
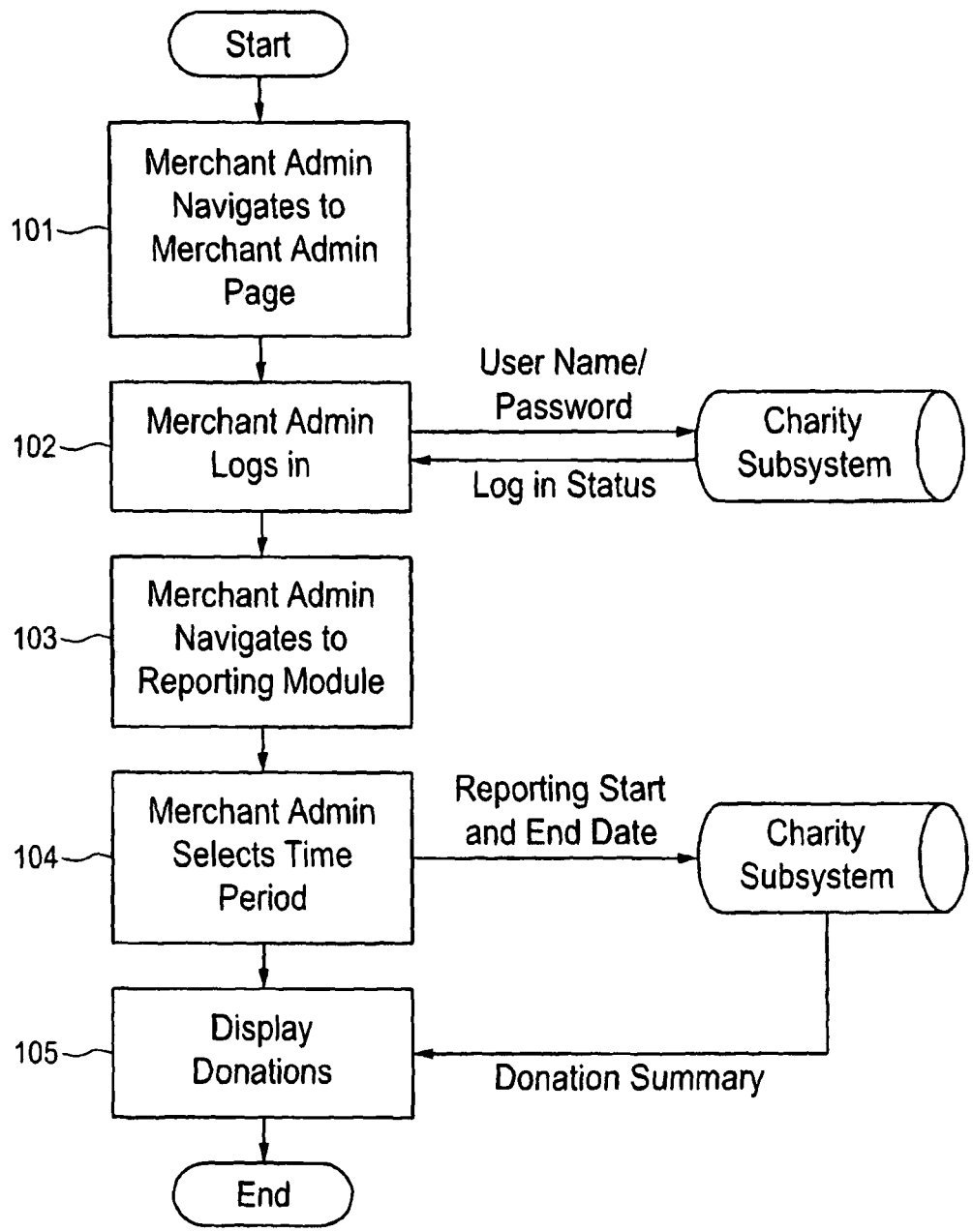
FIG. 11 illustrates how a charity views the donations that have been generated are displayed.
Figure 12:
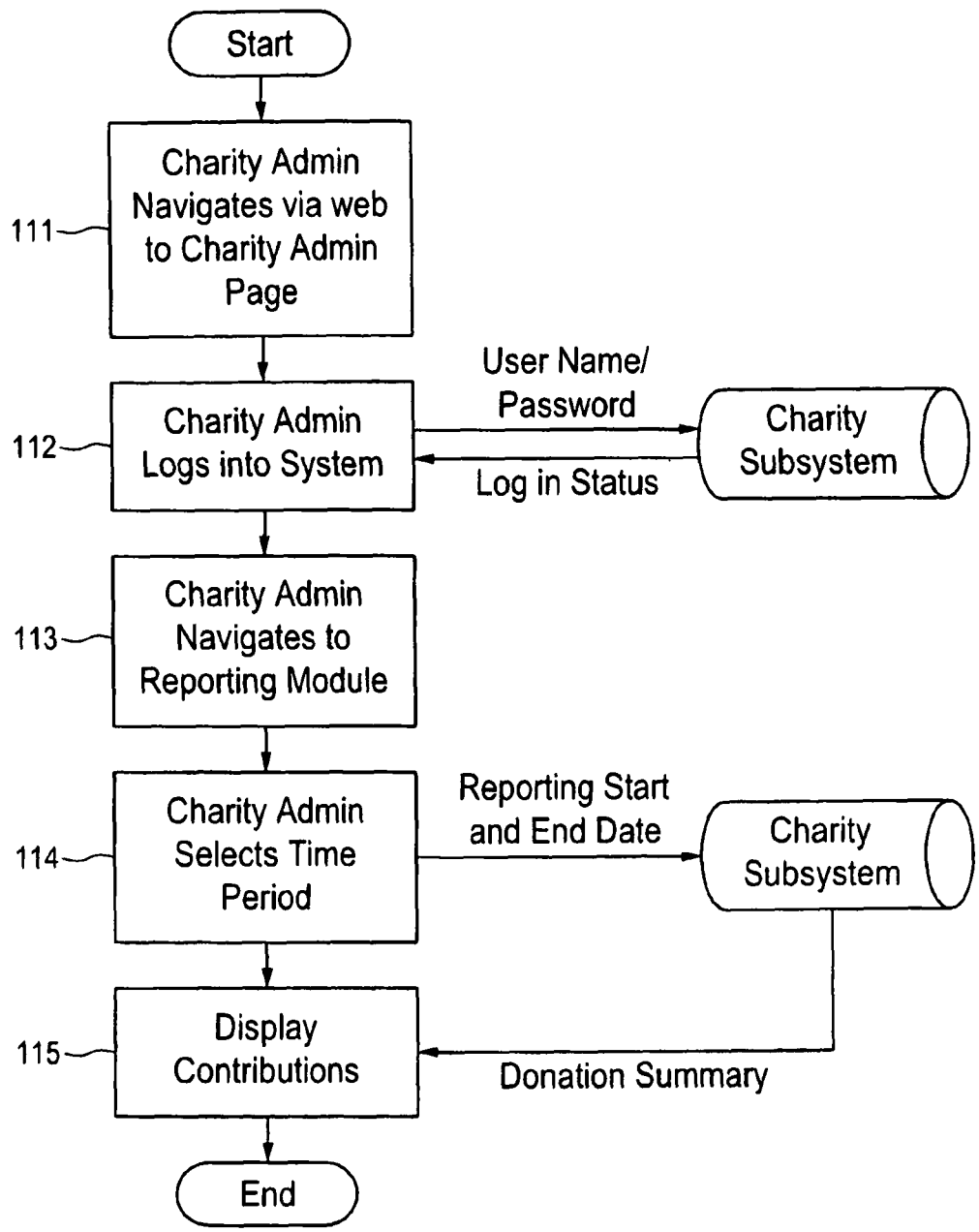
FIG. 12 illustrates how a charitable organization may elect to alter the cash donations provided.

The loyalty program platform may enable each of the merchants, members and charities to track and monitor the donation activity (further illustrated in FIGS. 10, 11, 12).

Figure 2:
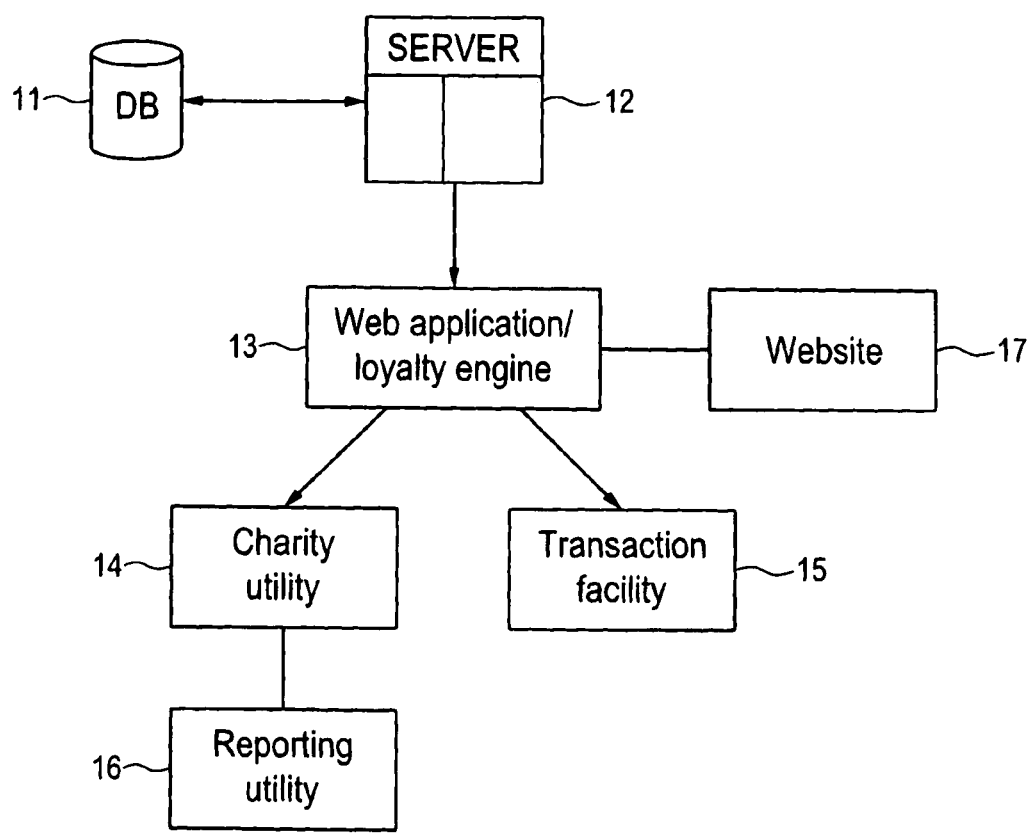
FIG. 2 is a system diagram illustrating the resources of the system of the present invention.

FIG. 2 best illustrates the system of the present invention. In one particular embodiment thereof, the system may be best understood as an extension of the functionality described in the Co-Pending Patent Application 2,546,151. The internet accessible loyalty program platform may be housed on a server computer (12). The server computer may also interact with a database (11). The loyalty program or loyalty engine may be accessible to the public via a web application (13) that may generate a member/merchant/charity accessible website (17) which may enable all of the parties (member/merchant/charity) to interact with the loyalty program as particularized in the Co-Pending Patent Application 2,468,386. The loyalty engine web application (13) can be further broken down into two sub components, the charity utility (14) and the transaction facility (15). In one example of an implementation of the charity utility (14), it may be best viewed as a software component of a web utility that provides the loyalty engine particularized in the Co-Pending Patent Application 2,546,151. The charity utility (14) may be programmed in a manner that is known to those skilled in the art, and may be operable to provide on the database information regarding the charity accounts of the loyalty program members, the charity accounts of the loyalty program merchants, the merchant defined rules, and thereby the contributions that have been made to a particular charity based on the charity defined rules. Once the rules have been set up, the charity utility (14) may serve to apply the rule sets for donation generation and accrual of donations to be made by the plurality of merchants to the applicable charities based on one or more transactions between the plurality of merchants and the members Database access may be restricted and may be provided for by a known administration utility that provides hierarchical access to the database (11), depending on permissions defined by the operator of the loyalty system, to each of the respective members, merchants and charities. The goal behind the database access may be to provide transparency behind the donations that are made in operation of the loyalty program.

The charity utility (14) can be further broken down into a reporting utility (16) component. The purpose of the reporting utility (16) may be to provide various reports of interest to each of the respective members, merchants and charities. Of particular interest, the reporting utility (16) may permit merchants to generate reports on measured performance of charitable donations made by operation of the loyalty program, thereby enabling calibration of loyalty programs involving charitable donations as described in the Co-Pending Patent Application 2,546,151. The reporting utility (16) may also permit charities to generate reports on success of their promotions of the loyalty program to their contacts (including donors), as well as outside factors such as marketing and funding drives, thereby enabling charities to calibrate their use of the loyalty program in a manner similar to the processes described in the Co-Pending Patent Application 2,546,151.

The transaction facility (15) as described in the Co-Pending Patent Application 2,546,151 may provide the means and methods to capture transaction data. The transaction facility (15) may serve to process financial transactions between the loyalty program and the applicable charities based on one or more transactions between the plurality of merchants and the one or more members.

Figure 3:
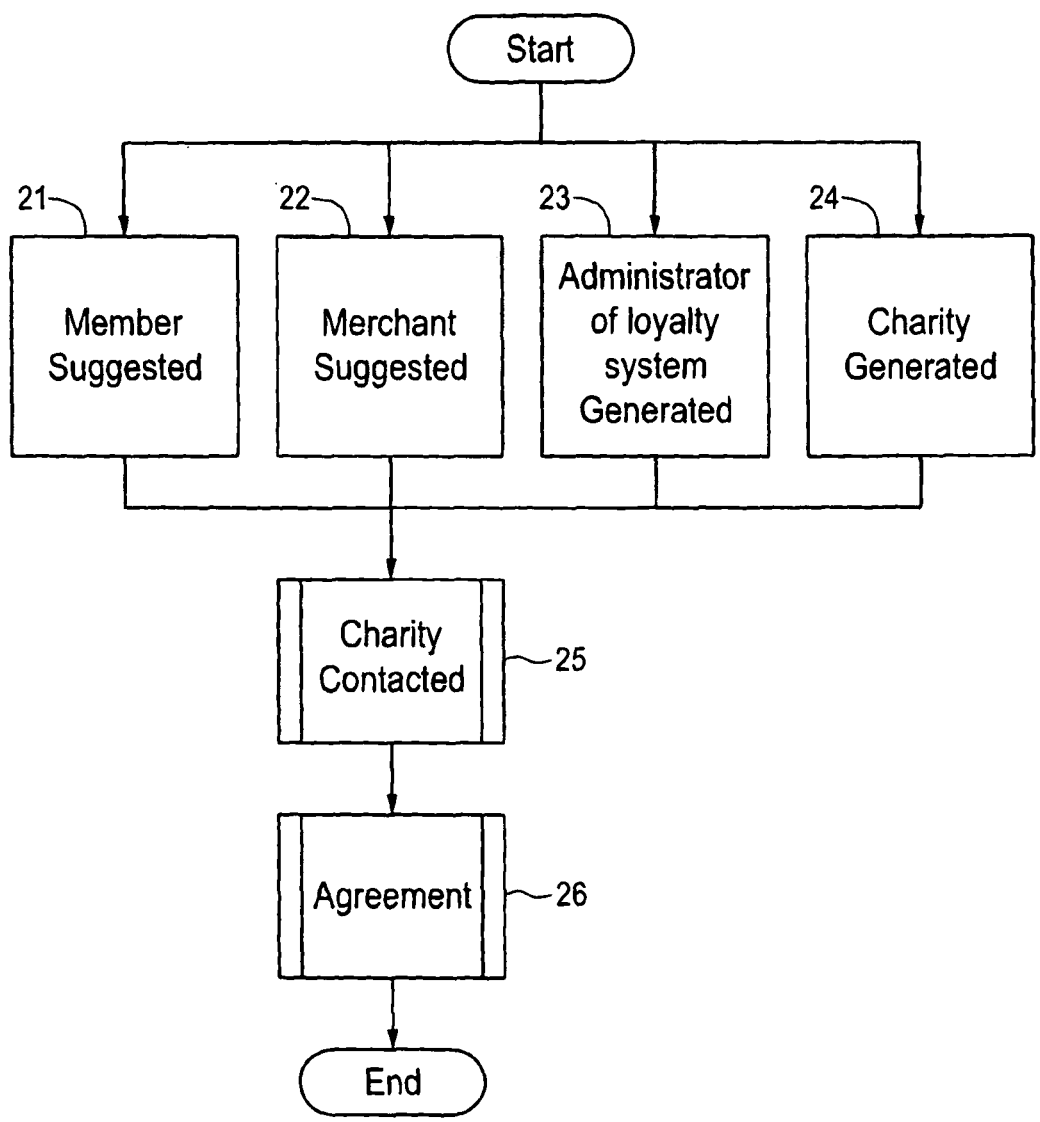
FIG. 3 illustrates a particular embodiment of the method of the present invention, according to which a charity is registered to a loyalty program platform.

FIG. 3 best illustrates the overview to registering a charity with the loyalty program. In this particular embodiment, the charity may be contacted in a variety of manners (member suggested (21), merchant suggested (22), administer of the loyalty system suggested (23) or from another charity (24)). Regardless of the means of contact, a charity may be contacted (25) and the charity may generally enter (26) into an agreement with the administrator of the loyalty program. The charity may agree contractually to participate in the loyalty program. The charity may then register with the loyalty program as described in the Co-Pending Patent Application 2,546,151 and with the assistance of the charity system administrator, the charity may establish the charity defined rules for donation receipt. In accordance with the present invention, these rules may include the rules for accumulating and redeeming in-kind donations as further particularized in the examples below. As a further aspect of the present invention, the rules may also include the particulars for determining the preferred manner of disbursing the donations mentioned herein, including in-kind donations. For example, these rules may address the rules associated with obtaining SVCs, the temporal accrual period for redeemable donation issuance (i.e. how often will in-kind donations be received by the charity). In another embodiment of the invention, in addition to the temporal period element, the charity may be able to set up a dollar value base threshold of donations that must be met before the redeemable in-kind donation are sent to the charity (e.g. once $5,000 has been donated, the SVCs will be sent to the charity) (further illustrated in FIG. 7). In another embodiment of the invention, a charity that has accumulated stored funds may not wish to activate the SVCs for business reasons (e.g. a service in-kind such as golf is not available in the winter) or because of the charity wanting to activate the SVC in conjunction with the launch of a new fund raising campaign.

Figure 4:
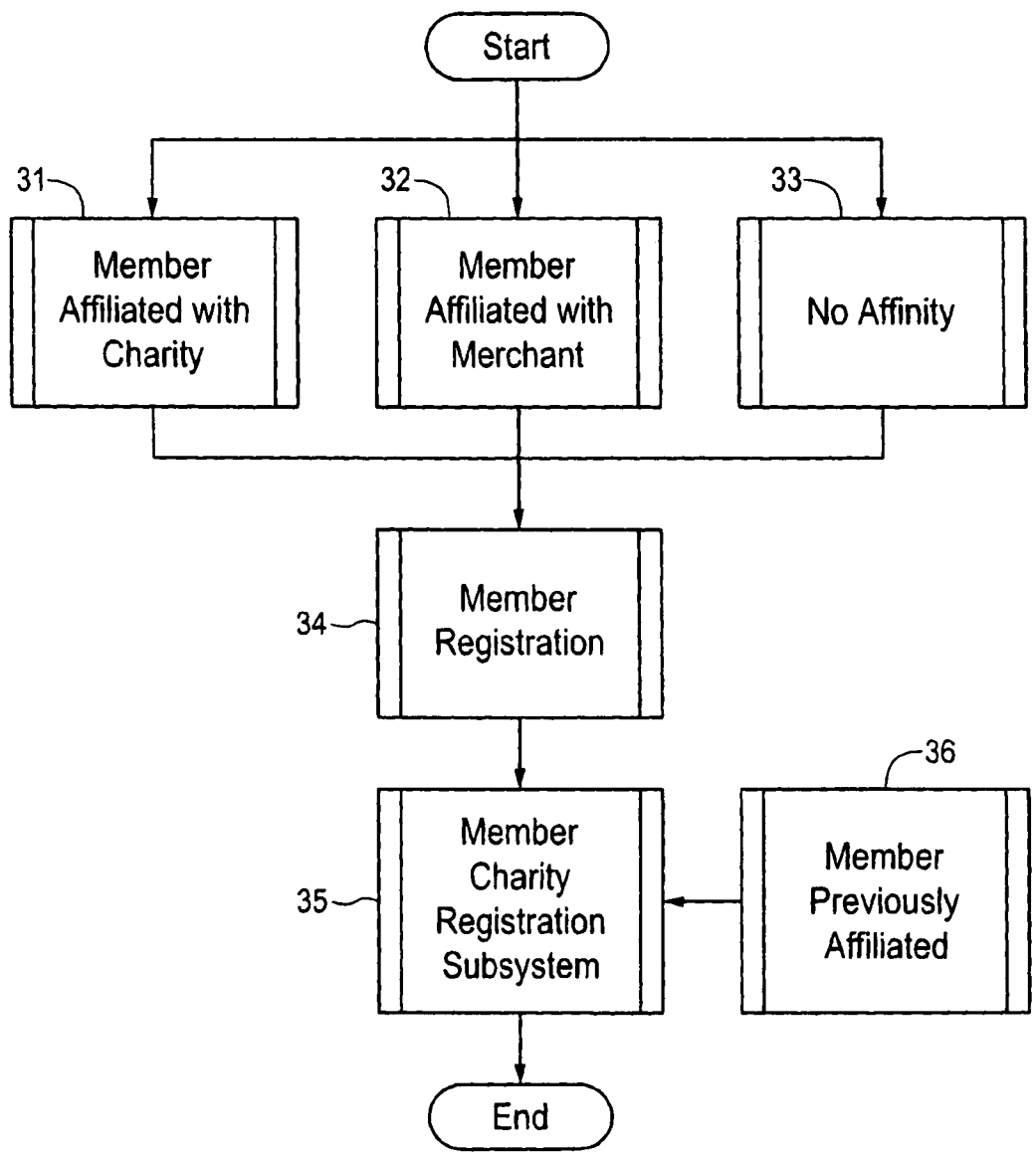
FIG. 4 is a flowchart that illustrates the member registration process, where a person becomes a member of the charity system.

FIG. 4 best illustrates the overview to registering a member with the loyalty program. In this particular embodiment, the member may be informed of the program through an affiliation with a charity (31), an affiliation with a merchant (32), or in some cases without any prior affiliation with either a charity or a merchant (33). The member may then register (34) with the loyalty program as described in the Co-Pending Patent Application 2,546,151. Once registered, (34) a member may become a participating member of the charitable system and the membership may be acknowledged (35) by the member charity registration subsystem. This state can also be attained by a member that may have been previously affiliated (36) with the loyalty system. Once designated a participating member, the member generally may incur no additional cost for this privilege and a percentage of the member's transaction may go to the charity that the merchant has identified at the rate defined by the merchant defined rules and interpreted by the transaction facility (15). In another embodiment of the present invention, the member may create member defined contribution rules making use of the loyalty program tools. These member defined rules may allow the member to indicate which charities the member would like to contribute to, as described in Co-Pending Patent Application 2,546,151.

Figure 5:
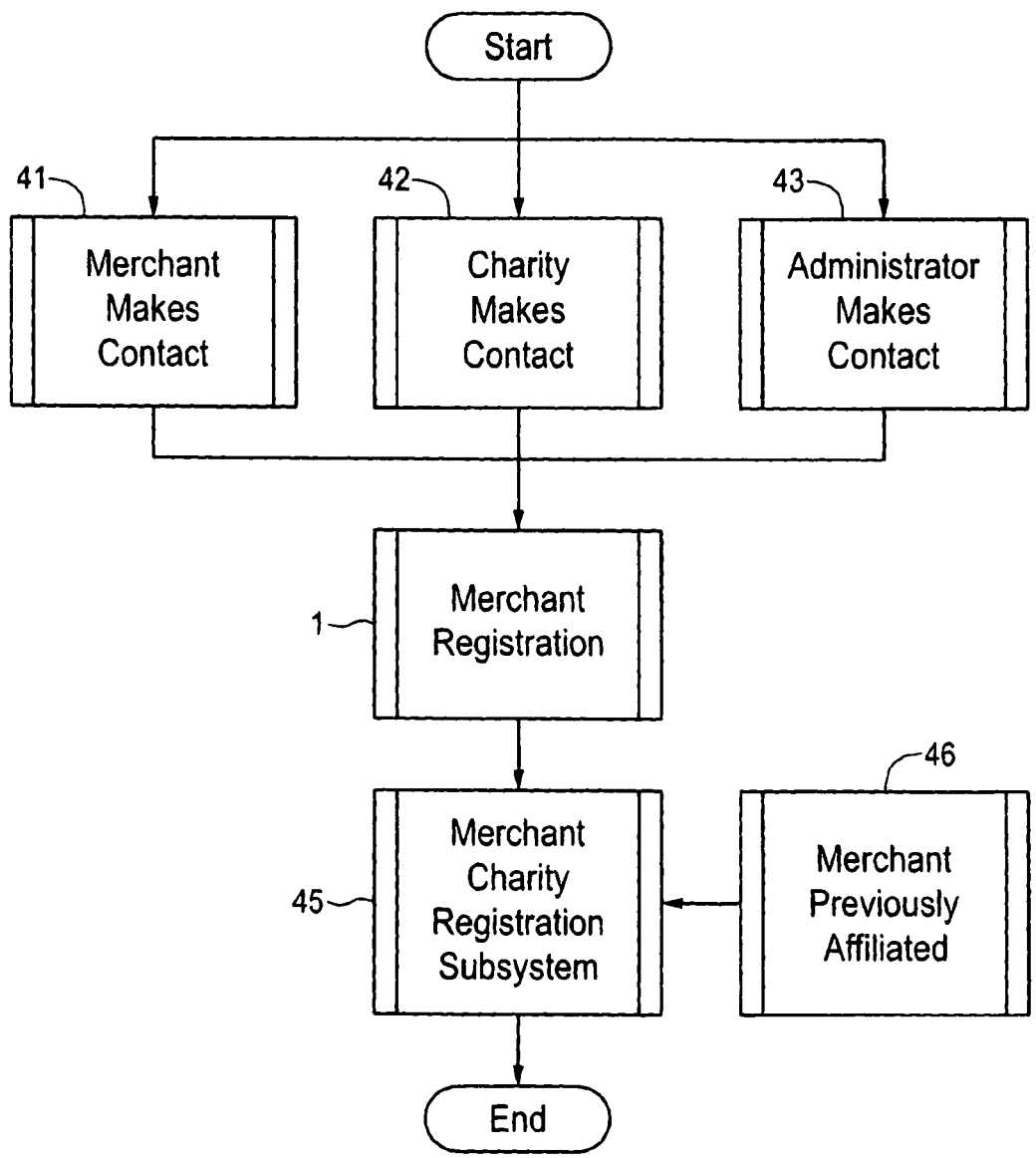
FIG. 5 is a flowchart that illustrates the merchant registration process, where a merchant becomes a partner of the charity system.

FIG. 5 best illustrates the overview to registering a merchant with the loyalty program. In this particular embodiment, the merchant may make contact (41) with the administrator of the loyalty system, the merchant may be contacted (42) by a charity, or the administrator of the loyalty program may contact (43) the potential merchant. In either case, the merchant may then register (1) with the loyalty program as described in the Co-Pending Patent Application 2,546,151. Once registered, (1) a merchant's membership may be acknowledged by the merchant charity registration subsystem (45). This registration state (1) may also be attained by a merchant that may have been previously affiliated (46) with the loyalty system. Once a member of the merchant charity registration subsystem, the merchant may make use of the defined loyalty program tools and may set up merchant defined rules (4) governing the donations that may be made by that particular merchant. For example, as described in the Co-Pending Patent Application 2,546,151, these merchant defined rules may in one particular embodiment define the following variables:
1) Min Transaction Amount=$100.00;
2) Date of Transaction (for current and future accrual periods);
3) Time of Transaction (any time of day, or if the donations will be made at particular hours of operation);
4) Terminal ID of the retail system that captured the financial transaction;
5) SKU number of items purchased; and
6) Donation Amount based on percentage of Total Transaction Amount (e.g. 1% so long as Total Transaction Amount is greater than set Min Transaction Amount).

It is noted that the present invention may provide the merchant with considerable donation flexibility. In one embodiment, the merchant may post donations based on member transactions for goods and services at specified times or range of times or based on other predetermined criteria. In addition, the merchant may decide on the donation level or amount and the determination of which charity is given the donation as defined by the rules between the merchant and the loyalty system for a given accrual period. Another aspect of the flexibility is that the merchant may adjust the percentage of donations generated on a forward basis and may edit the percentage of donation in future accrual periods. However, the system may allow a merchant to post differing offers within an accrual period to entice members to transact with him.

Figure 6:
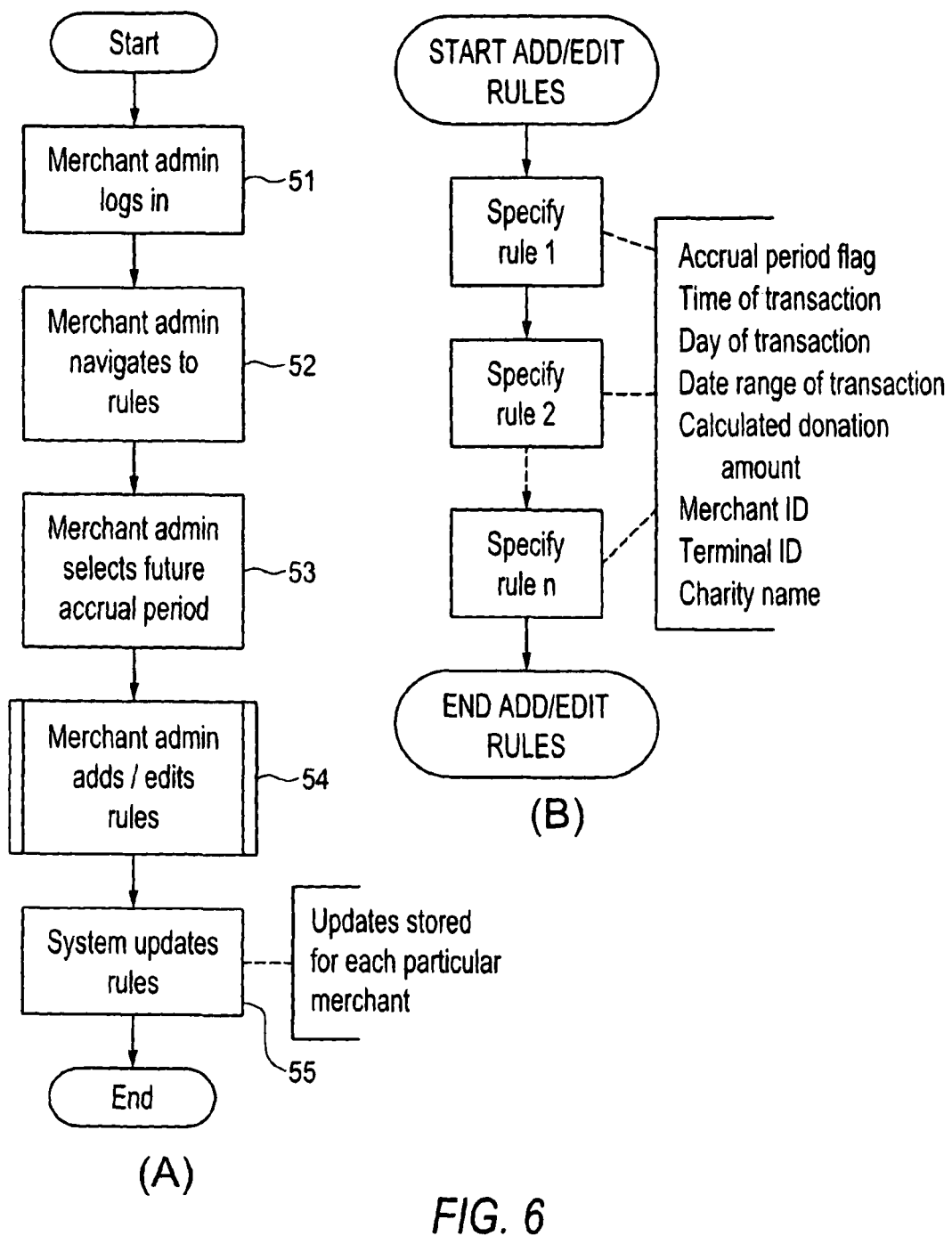
FIG. 6 illustrates the administration of the accrual time periods within the system.

FIG. 6 best illustrates the steps taken by which a merchant or merchant administrator of the loyalty program may access the loyalty program via the website (17) and add/edit the merchant defined donation rules (4) for future accrual time periods. The merchant administrator may log into (51) the loyalty system via the website (17). The merchant administrator may navigate (52) to the add/edit donation rules section. The merchant administrator may select (53) the future accrual time period to which the rules should be applied. The merchant administrator may then edit the rules (54) such as time of transaction, day of week transaction, date range of transaction, calculation of donation amount, merchant ID, terminal ID and the charity name. The loyalty engine (13) may respond to the request and may update (55) the rules internally.

Figure 7:
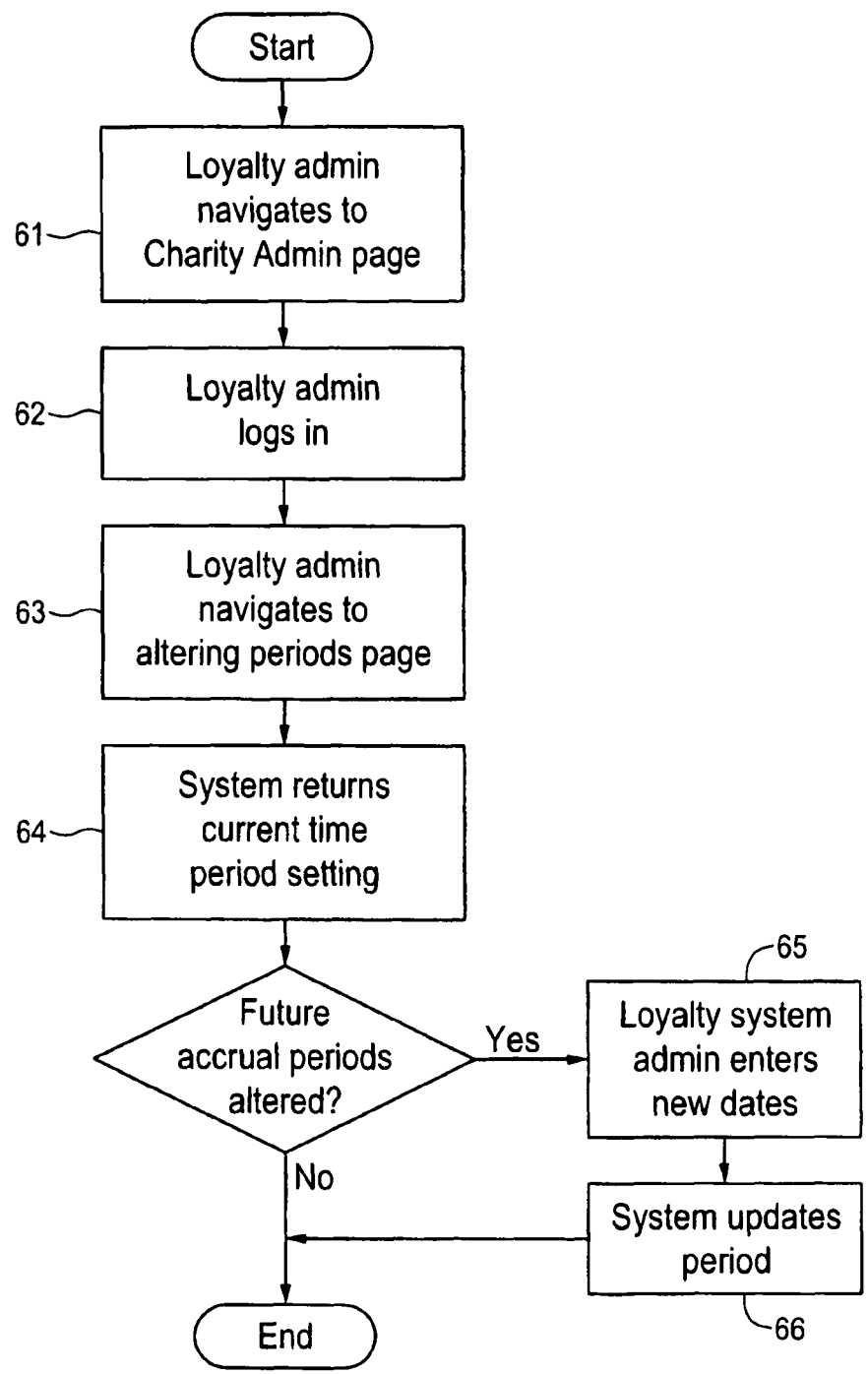
FIG. 7 illustrates the development of the donations from member transactions with a registered financial card at registered merchants. The amount of the donation generated is dependent on the merchant rules that a set within the loyalty system. A merchant decides what inventory at what time would qualify for the development of a donation.

FIG. 7 best illustrates defining the donation accrual time periods or the dollar value threshold of donations that may be required to be met before the redeemable donation in-kind is sent to the charity. In one embodiment of the invention, the loyalty system administrator may navigate (61) via the web to a charity administration webpage (17). The loyalty system administrator may log into (62) an administrative utility and may navigate (63) to a page pertaining to altering accrual time periods. The loyalty system may indicate (64) the current accrual time period setting (e.g. Quarterly, Calendar Date Range), the loyalty system administrator may then be permitted to alter (65) this accrual time period setting, and these settings may be stored (66) by the loyalty system. In a similar manner, another embodiment of the current invention may permit the accrual period to be replaced by a specific dollar value threshold of donations to be met before the issuance of redeemable donations in-kind. This threshold value may be set on the same administration page and may be stored by the loyalty system.

Figure 8:
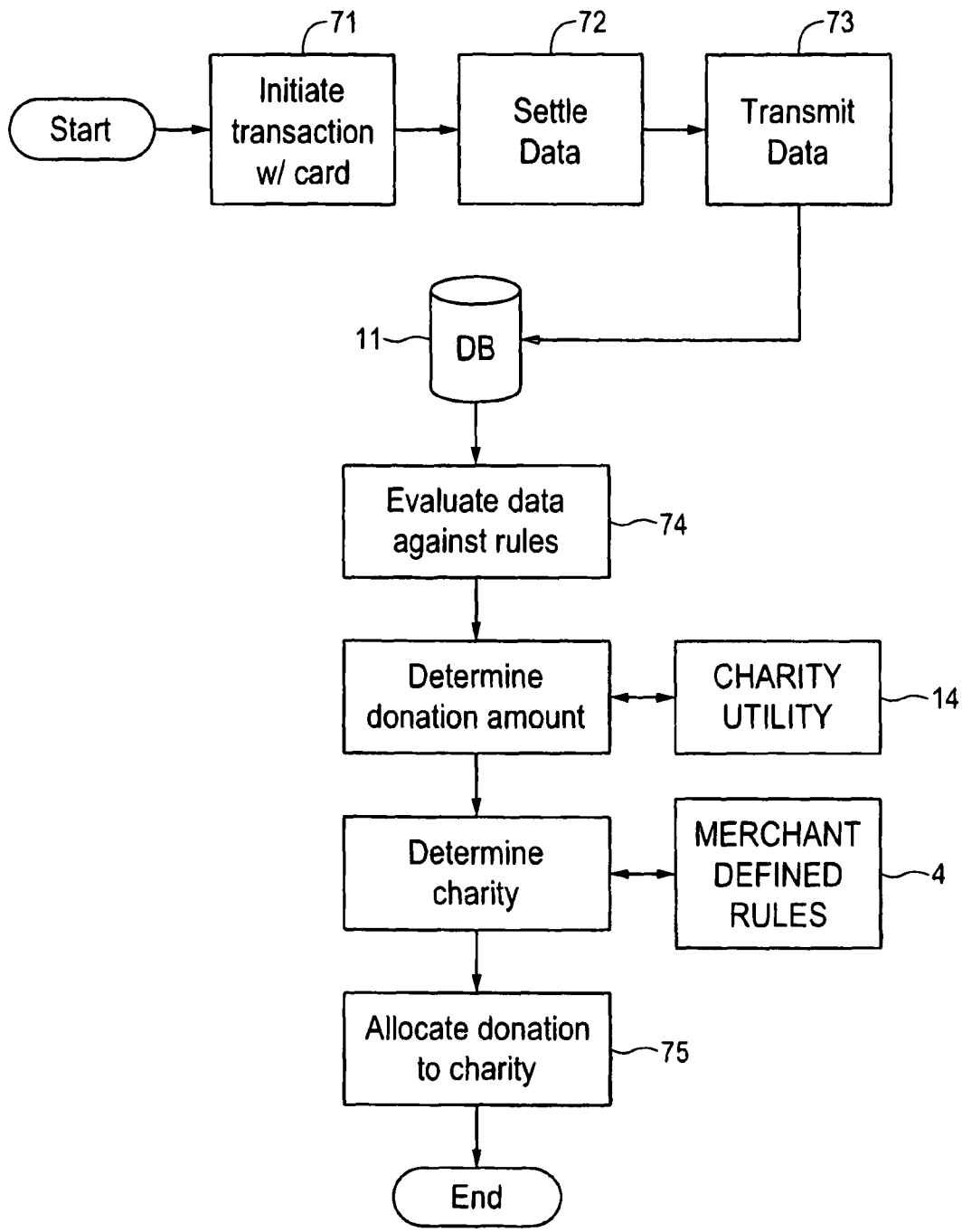
FIG. 8 illustrates how the member viewed donation amount is set within the system. The administrator of the loyalty system enters in a beginning and end date within the system and the system returns the total donations generated by member transactions combined with merchant rules that have been accumulated.

FIG. 8 best illustrates the development of the donations from member transaction to the charity receiving the donation in one aspect of the invention. A registered member may initiate (71) a transaction using a registered financial card with a merchant participating in the loyalty program. The merchant transaction data may then be settled (72) by a merchant acquirer. Once the transaction has been completed, the member transaction data may then be transmitted (73) to the loyalty program transaction facility (15) which may then store the transaction data on the loyalty program database (11). The member transaction information, which may include a merchant ID indicating the location of purchase, may then be evaluated (74) against the specified merchant rule set. Once evaluated, the system by way of the charity utility (14) may return the merchant calculated donation amount based on the transaction with the merchant. This amount may then be allocated (75) to the proper charity as defined by the merchant defined rules (4). In another embodiment of the present invention, the member can create member defined contribution rules making use of the loyalty program tools. These member defined rules may allow the member to indicate which charity or charities the member would like to sponsor as described in Co-Pending Patent Application 2,546,151 and before contributions are made to the charity, both the merchant defined rules and the member defined rules may be incorporated into the calculation of the donation amount.

For example, in the preferred embodiment of the invention, a loyalty system Member "Member1" may make a purchase at a loyalty system Merchant "Merchant1" using the Member's registered form of payment (e.g. credit card).

In an embodiment of the invention, the loyalty system may compare the transaction data with the Merchant1 defined rules (4) (e.g. donate 1% to Charity "A"). The loyalty system database (11) may augment the charity donation by 1% of the transaction.

In another embodiment of the invention (as described in Co-Pending Patent Application 2,546,151) the loyalty system may compare the transaction data against the Member1 and Merchant1 defined rules (e.g. Merchant1 donates 1% of the transaction and Member1 rules specify 50% of the Merchant donation is directed to Charity "A" and 50% of the Merchant donation is directed to Charity "B").

Figure 9:
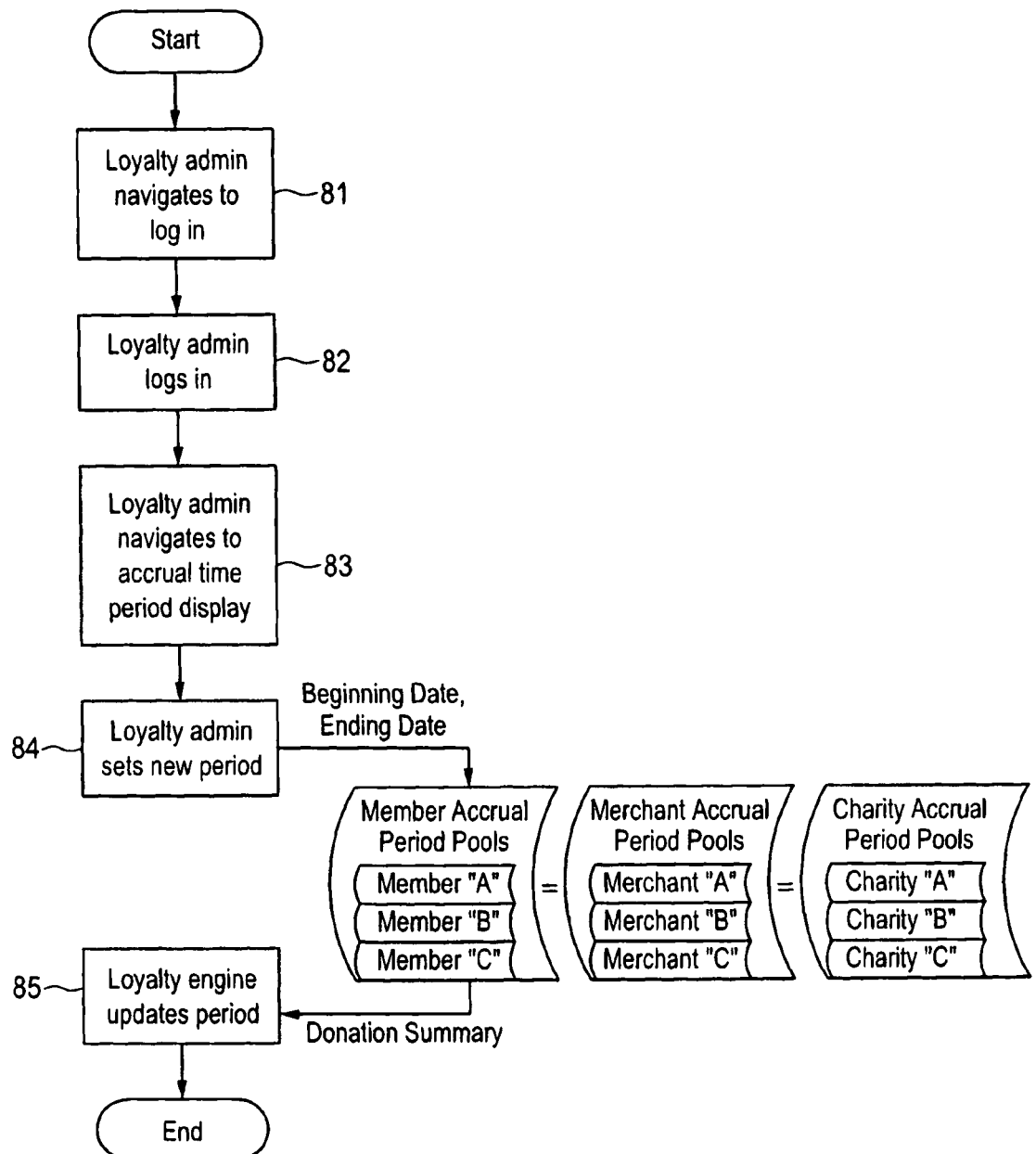
FIG. 9 illustrates how a member views the total donation amounts generated is displayed to the member.

FIG. 9 best illustrates the method by which the loyalty program system administrator may set the accrual display values (start date, end date) for future member donation display inquiries. The loyalty system administrator may navigate (81) to the administrator login screen website for the loyalty program (17). The loyalty system administrator may log into (82) the system and may navigate (83) to a web page that displays the accrual time period settings. The loyalty system administrator may then set (84) a new accrual time period by entering a beginning date and an ending date. The loyalty system administrator may log out of the system. The loyalty engine (13) may update this new information so future member donation inquiries may make use (85) of the new accrual time period for display.

FIG. 10 best demonstrates the method by which a member of the loyalty program may access the loyalty engine (13) via the website (17) and may display the donation contributions that have been made within a certain loyalty administrator defined accrual period (as described in FIG. 9). The member may navigate (91) via the web to the website (17) of the loyalty system. The member may log into (92) the loyalty engine (13) and then the member may navigate (93) to a webpage displaying the donation amount generated by member purchases. The donation results may be displayed using the loyalty system administrator predefined report parameters (e.g. start date, end date).

FIG. 11 best illustrates the steps taken by which a merchant or merchant administrator of the loyalty program may access the loyalty engine (13) via the website (17) and display the donation contributions that may have been made. Unlike the previously described member display (see FIG. 10), the merchant administrator may have the ability to request its own report parameters (start date, end date) for the donation reporting period to be displayed. The merchant administrator may navigate via the web to the website (17) of the merchant administration page (101) of the loyalty engine (13). The merchant administrator may log into (102) the administration system and then the merchant administrator may navigate (103) to the reporting module and may select (104) a desired start date and end date for the reporting window. The loyalty engine (13) may respond to the request and may display (105) the donations that were made within the desired reporting window period for each of the charities that receive merchant donations (as defined by the merchant rules).

FIG. 12 best illustrates the steps taken by which a charity or charity administrator of the loyalty program may access the loyalty engine (13) via the website (17) and display the donation contributions that have been made. Similar to the previously described merchant display (see FIG. 11), the charity administrator may have the ability to request their own report parameters (start date, end date) for the donation reporting period to be displayed. The charity administrator may navigate via the web to the webpage (17) of the charity administration page (111) of the loyalty engine (13). The charity administrator may log into (112) the charity administration system of the loyalty engine (13). The charity administrator may navigate (113) to the reporting module and may select (114) a desired start date and end date for the reporting window. The loyalty engine (13) may respond to the request and may display (115) the donations that were made within the desired reporting window period for each of the contributing merchant(s).

Figure 13:
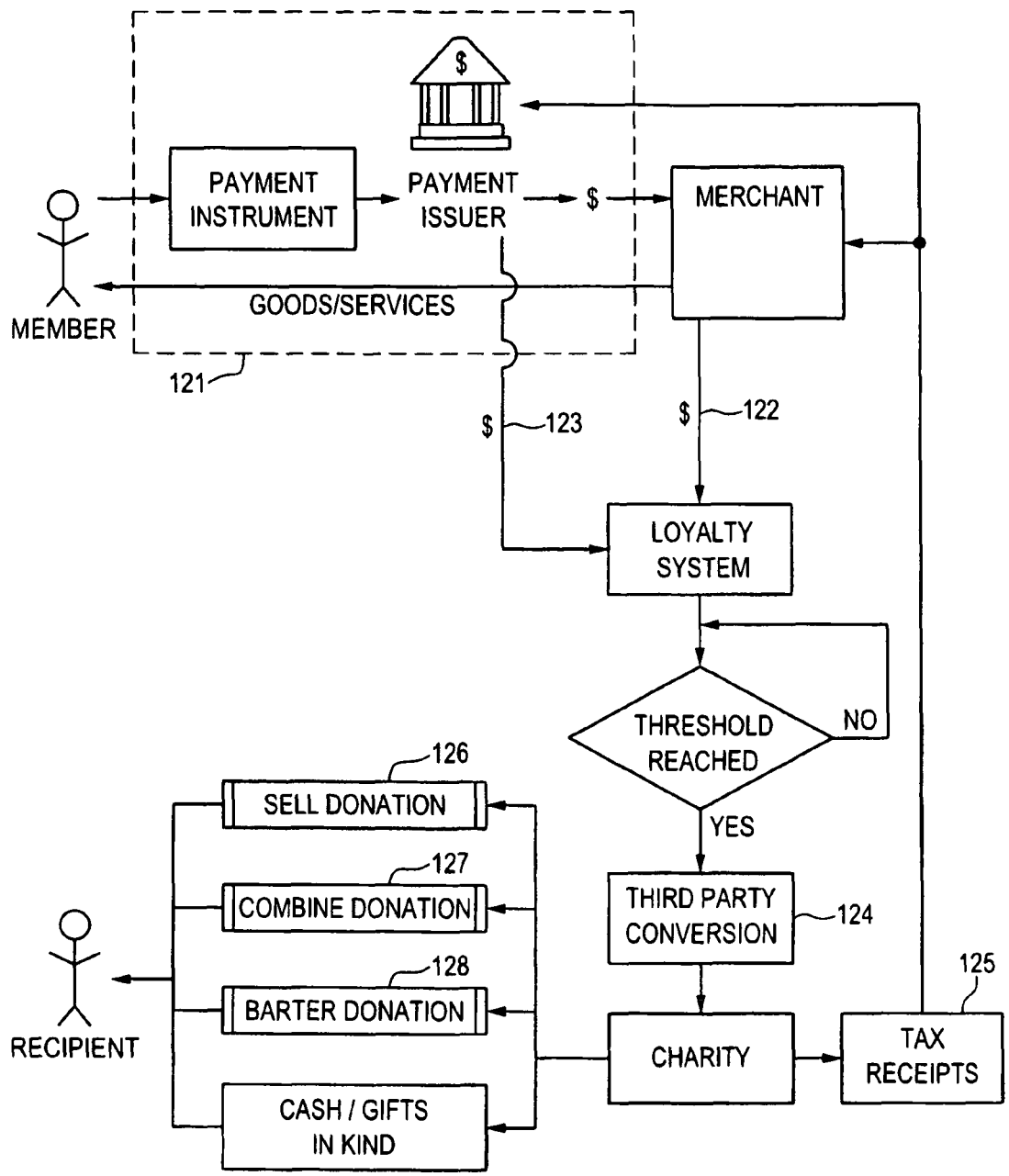
FIG. 13 illustrates how a merchant logs onto the loyalty system and adds/edits merchant defined rules.

FIG. 13 further illustrates the present invention from member transaction to in-kind donation to the recipient. The member may make a purchase (121) at the merchant's place of business using a registered payment instrument. The merchant in turn may make a donation (122) to the loyalty system and in another embodiment of the current invention, the payment issuer may make a donation (123) to the loyalty system. Once a desired threshold is reached (i.e. temporally or a dollar value threshold), a third party may convert (124) the donations into the preferred embodiment which may be an SVC. In addition, the charity may issue (125) tax receipts to the contributors to the loyalty system (merchant and/or payment issuer). Lastly the charity may have several options with regards to the SVC. They may give it directly to the recipient beneficiary or they may sell (126) the donations, combine (127) the donations or barter (128) the gifts in-kind and in turn give the end result to the recipient beneficiary.

What is claimed is:

1. A method comprising a plurality of steps performed by a server computer comprising:
   means for receiving signals via a database interoperable to provide a web application facilitating access to a website, wherein:
   the website is accessible to facilitate interaction between a loyalty system and a plurality of:

members of the loyalty system;
participating merchants of the loyalty system; and
charities of the loyalty system;
and
the signals represent:
a designation of a charity, received via the website, from one said member;
a designation of a donation threshold, received via the website, from the charity;
and
a designation of a rule, received via the website, under which one of a plurality of participating merchants will make a donation to the charity based on a transaction with the one said member during a specified time period, wherein the rule includes the definition of the donation;
and
transaction data corresponding to the transaction between the one said member and the one of a plurality of participating merchants, wherein:
the transaction corresponds to a payment instrument associated with an account;
the transaction is conducted on the account; and
the account is issued by a payment issuer to the one said member;
the transaction data corresponding to the transaction between the one said member and the one of a plurality of participating merchants includes a transaction amount and relates to a commercial transaction conducted by the one said member and the one of a plurality of participating merchants;
the commercial transaction is coupled to a payment processing system which is adapted to process credit and debit transactions;
and
the commercial transaction involves the one of a plurality of participating merchants supplying a physical product to the one said member;
if the time at which the transaction occurred is within each of:
the specified time period corresponding to a predetermined accrual period for the one of a plurality of participating merchants;
a predetermined accrual period corresponding to the one said member; and
a predetermined accrual period corresponding to the designation of the charity;
then:
means for determining a donation amount of the donation by:
the one of a plurality of participating merchants based on a transaction amount in the transaction data and the rule; and
the payment issuer issuing the account to the one said member;
and
means, when:
the current time is beyond a predefined time period; and
the sum of the determined donation amount and prior said determined donation amounts is greater than the donation threshold, for triggering disbursement of a charitable gift, wherein the disbursement is selected from the group consisting of:
a conversion of a monetary value of the charitable gift into a Stored Value Card SVC);
a conversion of:
gifts in-kind into a monetary value of currency; and
the monetary value of the currency into a Stored Value Card (SVC);
and
a conversion:
by way of bartering, of gifts in-kind into a monetary value of currency; and
of the monetary value of the currency into a Stored Value Card (SVC);
and
means for disbursing the SVC to the designation of the charity.

2. The server computer of claim 1, wherein the donation amount is a percentage of a transaction amount of the transaction.

3. The server computer of claim 1, wherein the charitable gift is disbursed to a beneficiary on behalf of the charity.

4. The server computer of claim 1, wherein the server computer further comprises means for receiving signals identifying one or more rules for accumulating or redeeming donations.

5. The server computer of claim 1, wherein the donation threshold is further defined, at least in part, by the merchant.

6. The server computer of claim 1, wherein the donation amount is based on one or more rules defined by the transacting participating merchant.

7. The server computer of claim 1, wherein the donation amount only accrues during a specified time period or based on predetermined criteria.

8. The server computer of claim 1, wherein the server computer further comprises means for receiving signals providing instructions to change the one or more rules defined by the transacting participating merchant.

9. The server computer of claim 1, wherein the donation amount is further defined, at least in part, based on a rule defined by the member.

10. The server computer of claim 1, wherein the server computer further comprises means for generating a tax receipt for the payment issuer.

11. The server computer of claim 1, wherein the server computer further comprises means, upon detecting the donation has not been redeemed by a defined deadline, for returning the donation.

12. The server computer of claim 3, wherein the charitable gift is disbursed to a beneficiary based on one or more rules further defined, at least in part, by the charity.

13. Internet connected hardware comprising:
means for receiving signals via a database interoperable to provide a web application facilitating access to a website, wherein:
the website is accessible via the Internet to facilitate interaction between a loyalty system and a plurality of:
members of the loyalty system;
participating merchants of the loyalty system; and
charities of the loyalty system;
and
the signals represent:
a designation of a charity, received via the website, from one said member;
a designation of a donation threshold, received via the website, from the charity;
and
a designation of a rule received via the website under which one of a plurality of participating merchants will make a donation to the charity based on a transaction with the one said member during a specified time period, wherein the rule includes the definition of the donation;
and
transaction data corresponding to the transaction between the one said member and the one of a plurality of participating merchants, wherein:
the transaction corresponds to a payment instrument associated with an account;
the transaction is conducted on the account; and
the account is issued by a payment issuer to the one said member;
the transaction data corresponding to the transaction between the one said member and the one of a plurality of participating merchants includes a transaction amount and relates to a commercial transaction conducted by the one said member and the one of a plurality of participating merchants;
the commercial transaction is coupled to a payment processing system which is adapted to process credit and debit transactions;
and
the commercial transaction involves the one of a plurality of participating merchants supplying a physical product to the one said member;
if the time at which the transaction occurred is within each of:
the specified time period corresponding to a predetermined accrual period for the one of a plurality of participating merchants;
a predetermined accrual period corresponding to the one said member; and
a predetermined accrual period corresponding to the designation of the charity;
then means for determining a donation amount of the donation by:
the one of a plurality of participating merchants based on a transaction amount in the transaction data and the rule; and
the payment issuer issuing the account to the one said member;
and
means, when:
the current time is beyond a predefined time period; and
the sum of the determined donation amount and prior said determined donation amounts is greater than the donation threshold, for triggering disbursement of a charitable gift, wherein the disbursement is selected from the group consisting of:
a conversion of a monetary value of the charitable gift into a Stored Value Card (SVC);
a conversion of:
gifts in-kind into a monetary value of currency; and
the monetary value of the currency into a Stored Value Card (SVC);
and
a conversion:
by way of bartering, of gifts in-kind into a monetary value of currency;
and
of the monetary value of the currency into a Stored Value Card (SVC);
and
means for disbursing the SVC to the designation of the charity.

14. A non-transitory computer-readable medium or media having stored thereon computer readable instructions for configuring the Internet connected hardware as defined in claim 13.

15. A method comprising a plurality of steps that include:
receiving signals via a database interoperable to provide a web application facilitating access to a website, wherein:
the website is accessible to facilitate interaction between a loyalty system and a plurality of:
members of the loyalty system;
participating merchants of the loyalty system; and
charities of the loyalty system;
and
the signals represent:
a designation of a charity, received via the website, from one said member;
a designation of a donation threshold, received via the website, from the charity;
and
a designation of a rule, received via the website, under which one of a plurality of participating merchants will make a donation to the charity based on a transaction with the one said member during a specified time period, wherein the rule includes the definition of the donation;
and
transaction data corresponding to the transaction between the one said member and the one of a plurality of participating merchants, wherein:
the transaction corresponds to a payment instrument associated with an account;
the transaction is conducted on the account; and
the account is issued by a payment issuer to the one said member;
the transaction data corresponding to the transaction between the one said member and the one of a plurality of participating merchants includes a transaction amount and relates to a commercial transaction conducted by the one said member and the one of a plurality of participating merchants;
the commercial transaction is coupled to a payment processing system which is adapted to process credit and debit transactions;
and
the commercial transaction involves the one of a plurality of participating merchants supplying a physical product to the one said member;
if the time at which the transaction occurred is within each of:
the specified time period corresponding to a predetermined accrual period for the one of a plurality of participating merchants;
a predetermined accrual period corresponding to the one said member; and
a predetermined accrual period corresponding to the designation of the charity;
then:
determining a donation amount of the donation by:
the one of a plurality of participating merchants based on a transaction amount in the transaction data and the rule; and
the payment issuer issuing the account to the one said member;
triggering disbursement of a charitable gift when:
the current time is beyond a predefined time period; and the sum of the determined donation amount and prior said determined donation amounts is greater than the donation threshold, wherein the disbursement is selected from the group consisting of:
- a conversion of a monetary value of the charitable gift into a Stored Value Card (SVC);
- a conversion of:
  - gifts in-kind into a monetary value of currency; and
  - the monetary value of the currency into a Stored Value Card (SVC);
  and
- a conversion:
  - by way of bartering, of gifts in-kind into a monetary value of currency; and
  - of the monetary value of the currency into a Stored Value Card (SVC);

generating a tax receipt for the charitable gift; and upon detecting the charitable gift has not been redeemed by a defined deadline, returning the charitable gift.

16. A non-transitory computer-readable medium or media having stored thereon computer readable instructions for performing the plurality of steps of claim 15.

* * * * *